United States Patent

[11] 3,618,117

[72] Inventor Hermann Kaiser
 Detroit, Mich.
[21] Appl. No. 814,132
[22] Filed Apr. 7, 1969
[45] Patented Nov. 2, 1971
[73] Assignee Eaton Yale & Towne Inc.
 CLeveland, Ohio
 Continuation-in-part of application Ser. No. 753,948, Aug. 20, 1968, now Patent No. 3,552,768.

[54] CRASH SENSOR AND RECORDER
 26 Claims, 5 Drawing Figs.
[52] U.S. Cl............................................ 346/7,
  200/61.45, 280/150 AB
[51] Int. Cl........................................B60r 21/08,
  G01p 13/00
[50] Field of Search......................................... 346/7;
  73/489, 492; 200/61.53, 61.45; 180/103, 91;
  280/150, 150 AB; 116/114.29

[56] References Cited
UNITED STATES PATENTS
3,031,545 4/1962 Waller............................ 200/61.45
3,156,794 11/1964 Vold............................... 200/61.45
3,183,512 5/1965 Castle............................ 346/7
3,218,870 11/1965 Baker............................. 73/492
3,495,675 2/1970 Hass et al....................... 180/91

Primary Examiner—Joseph W. Hartary
Attorney—Yount, Flynn & Tarolli

ABSTRACT: An improved sensor assembly for actuating a vehicle safety apparatus upon the occurrence of an accident includes a mass which is urged against an energy-absorbing stop by a plurality of resiliently yieldable contact fingers with sufficient force to prevent movement of the mass to an actuated position due to vehicle braking and the encountering of abnormal road conditions. The restraining effect that each of the spring fingers exerts against the mass is predetermined and the spring fingers are disposed around the mass so that upon the occurrence of an accident, the mass will move to its actuated position for any accident having a magnitude equal to or greater than a predetermined minimum magnitude over a wide range of directions of impact. A scribe is located on the mass and is operable to record an indication of the movement of the mass from its initial position. When an impact of a predetermined minimum magnitude or greater occurs, the mass moves against the influence of the contact fingers. This movement of the mass causes the contact fingers to engage a fixed contact while the scribe provides an indication of the direction and magnitude of the impact. The engagement of the contact fingers and the fixed contact completes a circuit for effecting operation of the vehicle safety apparatus.

PATENTED NOV 2 1971 3,618,117

INVENTOR
HERMANN KAISER

BY
Yount, Flynn & Tarolli
ATTORNEYS

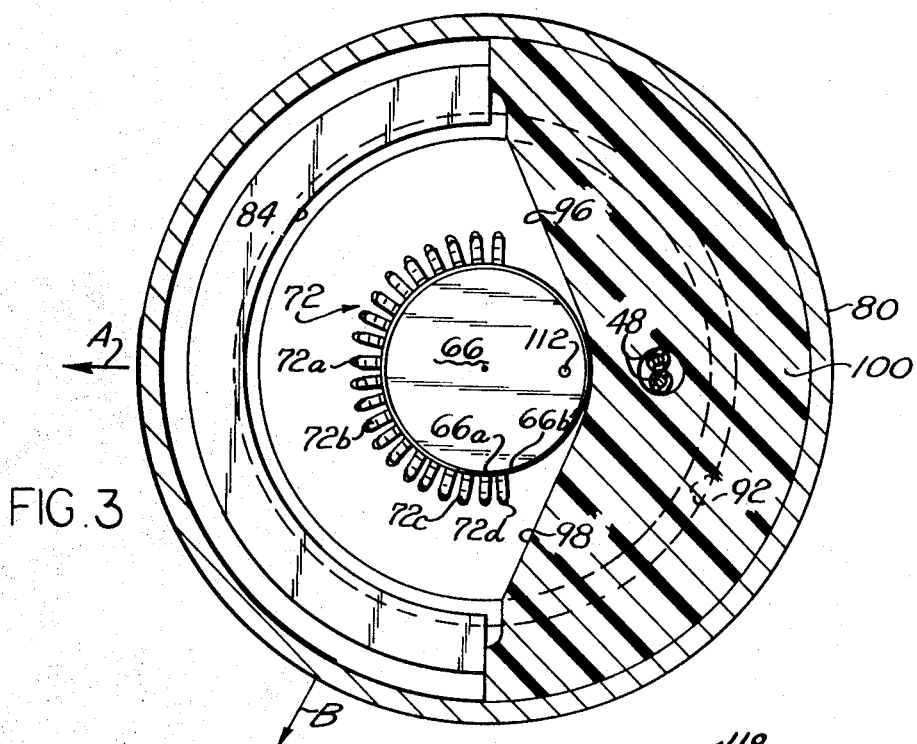
FIG. 3
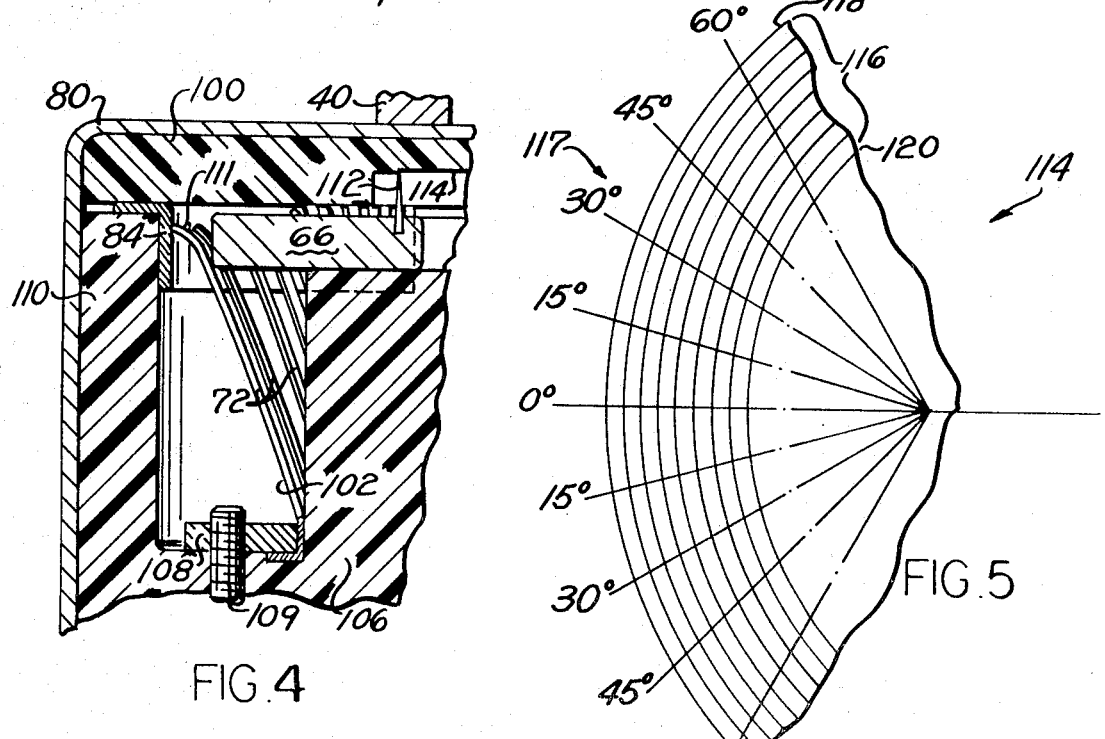
FIG. 4
FIG. 5
INVENTOR
HERMANN KAISER
BY Yount, Flynn & Tarolli
ATTORNEYS

CRASH SENSOR AND RECORDER

This application is a continuation-in-part of copending U.S. application Ser. No. 753,948, filed Aug. 20, 1968, now Pat. No. 3,552,768.

The present invention relates to a collision sensor for use in actuating a safety device on a vehicle and, more particularly, to a collision sensor having a mass movable against a biasing force in response to an accident to actuate the safety device and to effect recordation of an indication of the magnitude of the accident.

A known collision sensor for activating a safety device requires a force of a predetermined magnitude to operate the sensor to an actuated condition. Generally, the force required to operate the sensor can come from any direction and still operate the sensor if the force to which the sensor is subjected reaches the predetermined magnitude. Thus, if the vehicle is subjected to a head on impact of a predetermined magnitude, the sensor will be set off. However, if a fender of the vehicle is subject to a side impact of the same magnitude, a large amount of the energy of impact will be absorbed by a crumpling of the fender. Therefore, the known sensor will be subjected to a smaller deceleration force which will either be insufficient to operate the sensor or will require a greater time in which to effect operation of the sensor. Thus, a known sensor responds differently when different portions of a vehicle are subjected to impacts of the same magnitude.

Therefore, it is an object of the present invention to provide a new and improved collision sensor assembly for effecting actuation of a safety apparatus disposed on a vehicle upon the occurrence of an accident and wherein the collision sensor assembly is constructed to discriminate between deceleration due to an accident and deceleration due to road conditions and is actuated in response to accidents of a given magnitude with a wide range of directions of impact.

Another object of the present invention is the provision of a new and improved collision sensor, as noted in the next preceding paragraph, wherein the sensor includes a mass movable in a plurality of directions to an actuated position under the influence of a predetermined minimum magnitude of impact within a wide range of directions of impact.

Another object of the present invention is the provision of a new and improved sensor, as noted above, wherein the mass moves against biasing means which comprises a series of spring fingers which apply unequal biasing effects to the mass when the mass moves in different directions and wherein the biasing effect applied by the spring fingers is related to the energy-absorbing capabilities of different parts of the vehicle in such a manner that the sensor responds to impacts of the same minimum magnitude against different parts of the vehicle.

Another object of this invention is to provide a new and improved collision sensor for effecting actuation of a safety apparatus upon the occurrence of an accident wherein the collision sensor is operable to provide a recorded indication of the magnitude of the accident.

A further object of the present invention is the provision of a new and improved collision sensor, having a mass which is moved in response to the occurrence of an accident to effect actuation of a vehicle safety apparatus and wherein a scribe is located on the mass and a recording grid is disposed adjacent the scribe so that movement of the mass from its initial position effects a recording by the scribe upon the grid of an indication of the relative magnitude and direction of impact forces associated with the accident.

These and other objects and features of the present invention will become more apparent upon a consideration of the following description of a preferred embodiment of the present invention taken in conjunction with the accompanying drawings wherein:

FIG. 3 is a schematic illustration, taken along the line 3—3 of FIG. 2, further illustrating the structure of the sensor assembly and in particular the structure of a scribe for recording on a grid an indication of the direction and magnitude of an impact;

FIG. 4 is a fragmentary view illustrating the sensor in a condition in which the mass has moved to complete a circuit to actuate the safety device during an accident; and FIG. 5 is an enlarged fragmentary view, taken along the line 5—5 of FIG. 2, illustrating the grid and potential movements of the scribe relative to the grid.

Figure 1:
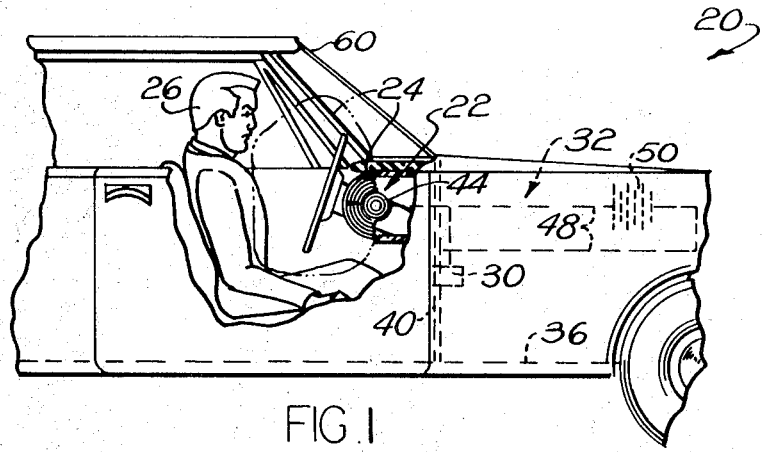
FIG. 1 is a schematic illustration showing a safety apparatus constructed in accordance with the present invention and associated with an automotive vehicle.

The present invention provides a collision sensor assembly for detecting the occurrence of an accident and effecting actuation of a vehicle safety apparatus to an operated condition to protect an occupant of the vehicle. The collision sensor assembly includes a mass which is biased to an inactive or initial position against the energy-absorbing stop member by a plurality of resiliently yieldable contact fingers which are operable to provide different biasing effects to the mass when the mass moves in different directions to an actuated position in response to the forces of an accident. A scribe member is disposed on the mass and is operable to record on a grid member an indication of the relative magnitude and direction of impact when the mass is moved in response to an accident. During an accident, the mass moves to an actuated position against the influence of the contact fingers to effect activation of the safety apparatus by pressing the resiliently yieldable contact fingers against a fixed contact. The mass is operable to move to its actuated position under the influence of impacts of the same predetermined minimum magnitude against different parts of the vehicle. Although the vehicle safety apparatus and collision sensor assembly are illustrated in the drawing in particular locations on an automotive vehicle, it is contemplated that the safety apparatus and collision sensor assembly could be mounted in other locations.

Referring to FIG. 1, an automotive vehicle 20 is illustrated schematically and includes a safety apparatus 22. The safety apparatus 22 includes a confinement 24 which is inflated from a collapsed condition, shown in solid lines in FIG. 1, to an expanded condition, shown in dashed lines in FIG. 1, to restrain movement of an occupant 26 of the vehicle during an accident. A collision sensor assembly 30 is connected with the safety apparatus 22 by electrical circuitry 32 and is operative to detect the occurrence of an accident and effect activation of the safety apparatus 22 from an inoperative position to an operative position shown in dashed lines in FIG. 1. In the present embodiment of the invention, the sensor assembly 30 is mounted on a firewall 40 of the vehicle 20. However, it is contemplated that the sensor assembly 30 could, if desired, be mounted on a frame member 36 or other part of the vehicle 20.

The safety apparatus 22 includes a fluid supply, in the present instance a reservoir 44 containing fluid under pressure. An explosive charge is associated with the reservoir 44, in a known manner, for forming an opening in the reservoir to enable the fluid to escape therefrom upon the occurrence of an accident. The explosive charge is detonated or activated by operation of the collision sensor assembly 30 upon the occurrence of an accident. Operation of the sensor assembly 30 completes a circuit through wires 48 of the circuitry 32 to conduct current from a source of power, such as a battery 50, to effect activation of the explosive charge.

Upon activation of the explosive charge and the formation of an opening in the fluid reservoir 44, fluid flows through the opening in the reservoir to inflate the confinement 24 from the collapsed condition, shown in solid lines in FIG. 1, to the expanded condition, shown in dashed lines in FIG. 1. The confinement 24, in the expanded condition, restrains forward movement of the occupant 26 to prevent him from engaging the windshield 60 or other parts of the vehicle 20 under the influence of the forces of the accident. A pressure-responsive blowout assembly, of known construction, may be provided for forming an aperture in the confinement to minimize rebound of the occupant by enabling fluid to escape from the confinement. This flow of fluid results in the confinement 24 being deflated shortly after the occurrence of the accident.

The collision sensor assembly 30 includes a circular mass 66 (see FIGS. 2 and 3) supported in a housing 80 for movement relative thereto. The mass 66 is restrained against movement from an initial position or condition shown in FIGS. 2 and 3, to an actuated position or condition, shown in FIG. 4, by a plurality of resilient contact fingers 72. These contact fingers abuttingly engage the circular outer surface 76 of the mass 66 when the mass is in the initial or inactive position of FIGS. 2 and 3. The occurrence of an accident effects deceleration of the vehicle 20 and of the housing 80 of the collision sensor assembly 30. The deceleration results in the mass 66 being moved against the restraining effect of the yieldable contact fingers 72 to move the contact fingers into engagement with a semicircular fixed contact 84 to complete an electrical circuit between leads 48 and thereby effect operation of the safety apparatus 22.

The mass 66 is slidably supported on a generally horizontal surface 90 (FIG. 2) in a chamber 92 formed in the housing 80. A pair of angularly related stop or sidewalls 96 and 98 (FIG. 3) are provided in the housing for blocking movement of the mass 66 in certain directions. In the illustrated embodiment, the walls 96 and 98 are part of an upwardly projecting stop section 100 and intersect at an included angle of 120°, i.e., 60°, in opposite directions from the forward direction of the vehicle 20, indicated by the arrow A in FIG. 3, to limit the sideward and rearward movement of the mass 66. Therefore, the mass 66 is subject to sliding movement from the initial position to an actuated position due to accidents which result in forces providing for relative movement of the housing 80 and the mass 66 within the included angle between the walls 96 and 98. Such accidents, in general, would be accidents where the direction of impact is within the included angle between the walls 96 and 98.

The sensor assembly will be operated to an actuated condition in response to impacts of the same minimum magnitude regardless of the direction of impact as long as the direction of impact is within the included angle between the walls 96, 98. This is due to the fact that in the illustrated embodiment of the invention, the distance the mass 66 moves is constant and the biasing effect of the spring fingers 72 differs as discussed more fully hereinbelow. The spring fingers 72 exert less force upon the mass 66 in directions where large amounts of the energy of impact will be absorbed by the vehicle and exert greater biasing forces upon the mass 66 in directions where the vehicle would not absorb large amounts of energy of impact. Therefore, the sensor 30 will respond in substantially the same manner to all impacts of the same magnitude where the direction of the impact is within the included angle between the walls 96, 98. In an accident where the mass 66 tends to move in a sideward or rearward direction relative to the housing 80, one of the walls 96, 98 of the stop section 100 will restrict such movement. Of course, an included angle more or less than 120° could be provided between the sidewalls 96, 98 or a plurality of sensors could be used.

When a vehicle having a sensor 30 becomes involved in an accident, the vehicle decelerates. The deceleration is not at a constant magnitude, but on the contrary, varies. Moreover, as parts of the vehicle crush during the initial stages of the accident, the vehicle could actually accelerate. The housing 80 of the sensor is attached to a part of the vehicle which decelerates and possibly accelerates after impact of the vehicle with an obstruction. The mass 66 being free to move relative to the housing 80 tends to move relative thereto during an accident due to the momentum of the mass 66 and moves relative thereto upon overcoming the restraining effects of the yieldable contact fingers 72.

In the event of an accident resulting in forces having both forward and sideward components, the mass 66 slides within the chamber 92 of the housing 80 against certain of the contact fingers 72 which may be offset to one side of some of the contact fingers engaged by the mass when it moves forwardly in the manner shown in FIG. 4. Thus, the contact fingers 72, which are moved into engagement with the fixed contact 84, vary as a function of the movement of the mass 66 relative to the housing 80. The force exerted by the contact fingers 72 varies according to the direction of impact on the vehicle. This results in a constant response time for any accident of a predetermined magnitude regardless of the direction of impact.

When the mass 66 tends to move forward under the influence of accident forces, the outer surface 76 of the mass 66 pivots certain of the contact fingers 72 relative to a base 102 of electrically conducted material from which the fingers 72 project and with which the fingers are integrally formed. The base 102 of electrically conductive material is mounted in the generally annular cavity 92 formed in a body 106 of electrically insulating material. A semicircular fixed contact ring 84 is mounted on an upstanding projection 110 which is located in an outer portion of the cavity 92. The base 102 of electrically conductive material is mounted by means of a contact block 108 in the base of the cavity 92. A suitable bolt 109 is provided to locate the electrically conductive material 102 in the base of the cavity 92. A lead wire 48 which connects the sensor 30 to a source of energy such as the battery 50 disposed on the base 108. The fixed contact 84 is connected with a wire 48 so that when the mass 66 slides and engages the contact fingers 72 with the contact 84, a circuit will be completed to energize the safety apparatus 22.

The contact fingers 72 perform two functions, that is, they act as a plurality of springs which are connected to the housing 80 and abuttingly engage with the circular surface 76 of the mass 66 to thereby restrain the mass 66 against movement from the initial position to an actuated position. The contact fingers 72 also function to complete an electrical circuit when they are moved into engagement with the fixed contact 84 by movement of the mass 66 relative to the housing 80.

The contact fingers 72 are disposed approximately 210° around the periphery of the mass 66 or in other words approximately 105° in opposite directions from the forward direction of the vehicle 20. While the contact fingers 72 act as a plurality of springs, each of the contact fingers 72 acts individually of the other contact fingers. Thus, it should be apparent that the number and specific fingers 72 that restrain the mass 66 from movement is dependent upon the direction that the mass 66 moves. Moreover, it should be obvious that as the mass 66 moves from its initial position to an actuated position the number of spring fingers that act on the mass 66 will decrease.

Figure 2:
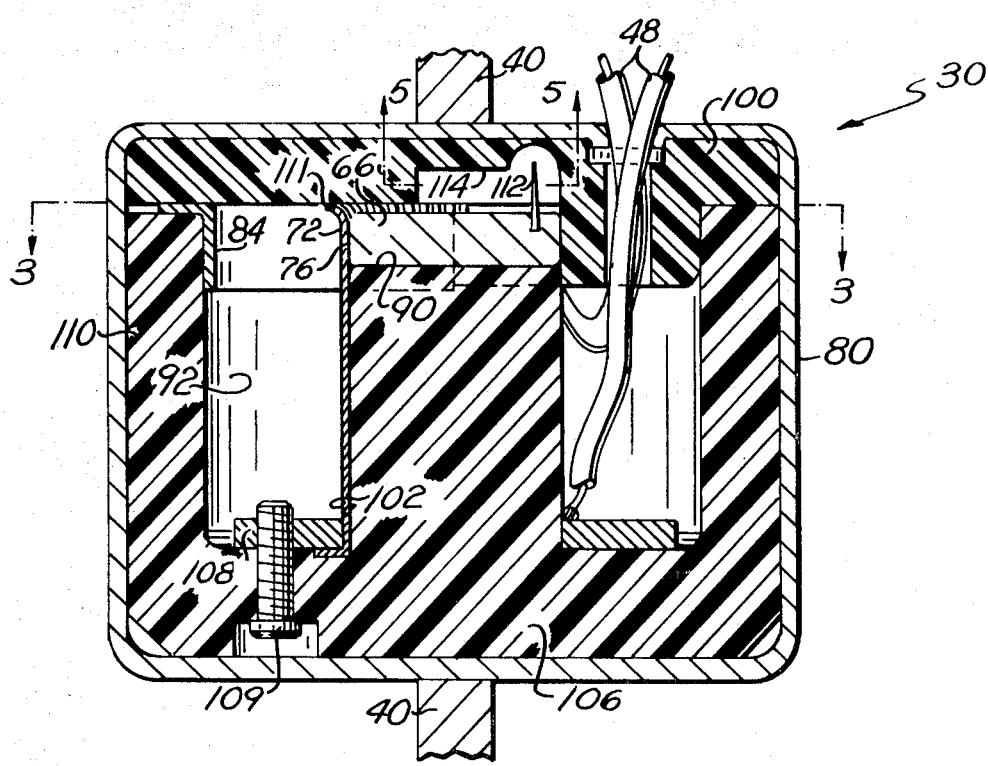
FIG. 2 is a schematic illustration, on an enlarged scale, of a sensor assembly for detecting the occurrence of an accident and effecting actuation of the safety apparatus from the collapsed condition of FIG. 1 to the expanded condition, shown in dashed lines in FIG. 1.

As illustrated in FIG. 3, the spring fingers 72 engage the mass and prevent it from moving during normal road conditions. The spring fingers 72a, 72b and 72c are disposed in a path in which the mass will move if the vehicle encounters a head-on impact. When the vehicle encounters a head-on impact, the mass will move in the direction of arrow A in FIG. 3. It should be noted that upon initial movement of the mass 66, the fingers 72a, 72b and 72c will tend to restrain the mass. It should be realized that the spring finger 72d will not restrain movement of the mass 66 if the vehicle encounters a head-on impact. As the mass continues to move in the direction of arrow A, some of the spring fingers 72 will slip off of the mass 66 and will cease to restrain its movement. For example, as the mass 66 moves in the direction of arrow A, the portion 66a of the mass 66 will move past the spring finger 72c and the spring finger 72c will no longer act to restrain movement of the mass. Moreover, as the mass continues to move in the direction of arrow A, the number of fingers 72 acting on the mass 66 will decrease, but the restraining force exerted by the fingers that continue to act upon the mass 66 will remain substantially constant. This is because the remaining spring fingers, such as 72a that continue to restrain the mass 66, are being continually bent from their initial position. As the fingers 72 are bent from their initial position as illustrated in FIG. 2, the restraining force exerted by the individual fingers, such as 72a, will increase as the fingers 72 act as nonlinear springs, i.e., the greater the deformation, the greater the restraining force. Therefore, it should be apparent that as the mass 66 moves from its initial position to an actuated position in the direction of arrow A, the number of spring fingers 72 restraining the mass 66 will decrease, but the force exerted by each remaining finger 72 will increase and the total force exerted by the remaining fingers will remain substantially constant. Thus, it can be seen that as the mass 66 moves to an actuated position, it will be acted upon by a substantially linear restraining force.

If the vehicle encounters an impact which is within the included angle between the walls 96 and 98 and which is other than a head-on impact, the mass 66 will move in a direction other than the direction of arrow A. If for example, the vehicle encounters an impact from the direction of arrow B points, the mass 66 will move in the direction of arrow B. It should be apparent that when the mass 66 moves in the direction of arrow B, it will be restrained by different contact fingers 72 than those that restrain the mass 66 when it moves in the direction of arrow A. Moreover, the mass 66 will be restrained by fewer contact fingers 72 when it moves in the direction of arrow B as the portion 66b of the mass 66 will not be restrained by contact fingers 72. When the mass 66 moves in the direction of arrow B, contact fingers 72, such as 72a, 72b 72c and 72d will restrain the mass 66. As the mass 66 moves to an actuated position, the number of contact fingers 72 restraining the mass 66 will decrease. However, the total restraining force exerted by the fingers 72 upon the mass 66 will remain substantially constant as described hereinabove. Therefore, the contact fingers 72 will exert a linear restraining force upon the mass 66 during movement of the mass 66 to an actuated position in any direction within the included angle between the walls 96 and 98.

The movement of the mass in different directions will effect different restraining forces being exerted by the fingers 72 as the number of fingers acting on the mass will vary with the direction of movement of the mass. Although the spring fingers 72 are nonlinear, all have substantially uniform spring rates and the total number of fingers acting on the mass 66 will determine the linear force that is restraining the mass.

It is desirable to have the spring fingers 72 apply different biasing effects to the mass 66 when the mass 66 moves in different directions so that at least one of the fingers 72 engages the fixed contact 84 for all accidents of the same minimum magnitude. Therefore, the minimum magnitude or severity of impact which is required to operate the sensor 30 to the actuated condition does not depend upon the direction of impact as long as the impact is within the included angle of the walls 96 and 98. Certain parts or portions of the vehicle 20 have a relatively large energy-absorbing capability while other parts of the vehicle have relatively small energy-absorbing capability. The difference in energy-absorbing capabilities of different parts of the vehicle causes variations in the force to which the sensor assembly 30 is subjected to due to impacts of the same magnitude on the different parts of the vehicle. Since it is desirable to have safety apparatus activated for any accident of a predetermined minimum magnitude, it is necessary to compensate for accidents where large amounts of the impact forces will be absorbed by the vehicle. Thus, it is desirable to vary the number of the resilient contact fingers 72 that restrain the mass 66 so that the biasing effect exerted by the contact fingers 72 is lower when the direction of impact is on a portion of the vehicle wherein a large amount of the energy of impact is absorbed by deformation of the vehicle.

For example, if the vehicle in a head-on accident having a specific magnitude or if the vehicle is involved in a side accident having the same magnitude, a different magnitude of force will be transferred to the collision sensor 30 depending upon the type of accident in which the vehicle is involved. In a side accident where the vehicle is hit be another vehicle is hit by another vehicle on a fender, crumpling of the fender will tend to absorb a large portion of the energy of impact of the accident. Whereas in a head-on accident there will be less crumpling of the vehicle and the impact force will be transferred through the frame of the vehicle to the collision sensor 30. Therefore, a greater number of resilient contact fingers 72 that together exert a large biasing effect on the mass 66 are positioned in the direction in which the mass 66 will move during a head-on impact and a smaller number of fingers that together exert a lower biasing effect will be positioned in the direction in which the mass 66 will move when there is an impact from the side of the vehicle. By this arrangement of the contact fingers 72, the mass 66 will be allowed to slide so that the movable contacts 72 are brought into engagement with the fixed contact 84 for accidents of equal magnitude independently of the direction of impact or of the deformability of the vehicle. To provide further compensation for the potential deformability of the vehicle, it is possible for the individual contact fingers 72 to apply a different biasing effect to the mass 66. This can be accomplished by bending the contact fingers so that their end portions 111 apply different preloads to the mass 66.

During many minor or low-speed accidents or impacts, the forces are insufficient to cause injury to an occupant of a vehicle and the safety apparatus 22 need not be operated. Thus, then the vehicle 20 collides with a rigid barrier at a low speed, the collision forces can be readily resisted by the occupant 26 and the average force on the mass 66 is incapable of moving the mass to the actuated position against the influence of the contact fingers 72. Therefore, the mass 66 is not sliding through a sufficient distance to engage the movable contact fingers 72 with the fixed contact 84 and the safety apparatus 22 remains in the inoperative condition shown in solid lines in FIG. 1.

A scribe or recording member 112 is disposed upon the mass 66 and is operable to record movement of the mass upon a grid or indicating member 114 adjacent thereto. Thus, when the mass 66 moves during an accident and effects engagement of the contact fingers 72 with the fixed contact 84, the scribe member 112 will be operable to record upon the grid member 114 the direction of impact and an indication that the impact was of sufficient magnitude to actuate the collision sensor 30. Moreover, the scribe member 112 will be operable to record upon the grid member 114 the direction and an indication of the magnitude of any impacts upon the vehicle 20 which do not effect actuation of the safety apparatus. In other words, if the vehicle encounters a minor accident or abnormal road conditions where the mass 66 is moved from its initial position, as shown in FIG. 1, to a position which does not effect engagement of the contacts 72 and 84, the scribe member 112 will be operable to effect permanent indication upon the grid 114 of an indication of the magnitude and the direction of these impacts. Furthermore, when the vehicle encounters an accident which effects actuation of the safety device, the scribe member 112 will be operable to record upon the grid the direction of the impact.

The grid member 144 is more fully illustrated in FIG. 5 and consists of a grid area 116 upon which the scribe member 112 is operable to record the direction and magnitude of movement of the mass 66. It should be observed that the area 166 has an outermost portion 118 which is the movement zone corresponding to critical accident conditions. In other words, if the scribe member 12 moves into the portion 118 of the grid 114, then activation of the safety device will occur and the contacts 72 will engage with the contact 84. During this type of situation, the grid member will only be operable to illustrate the direction of the movement of the mass and an indication of the relative magnitude of the forces to which the mass was subjected, i.e., it will show that the magnitude of movement of the mass 66 was large enough to activate the safety sensor 30.

On the other extreme of the grid area 116 is the portion 120. The portion 120 is disposed a predetermined distance from the initial position of the scribe member 112, as illustrated in FIG. 2, so that movement of the mass 66 and the scribe member 122 which are not above a predetermined magnitude will not be recorded. This will prevent the scribe 112 from recording movement of small magnitudes of the mass 66 which occur during normal road conditions. Movement of the scribe 112 across the grid member 114 from the portion 120 up to the portion 118 will show an indication of magnitude and direction of somewhat more severe impacts which do not actuate the sensor 30. Angular markings 117 may be provided on the grid portion 114 to facilitate in determining the direction of any impact in which the vehicle is involved.

Upon the occurrence of an accident which is likely to injure the occupant 26 of the vehicle 20, the mass 66 slides forward relative to the housing 80 upon overcoming the biasing effect of the contact fingers 72. The scribe member 112 will record upon the grid member 114 the direction of impact and will indicate that the impact was of sufficient magnitude to require activation of the safety apparatus 22 to protect the occupant 26 of the vehicle 20. However, if the vehicle 20 encounters conditions when the deceleration of the housing is relatively small or of an insufficient duration to overcome the biasing effects of the contact fingers 72, the mass will not move sufficiently to actuate the safety apparatus 22. During this invention, the scribe member 112 will be operable to record upon the grid member 114 the direction and indicate the magnitude of the impact.

Displacement of the mass 66 increases substantially with an increase in the speed at which the vehicle encounters an accident. At a predetermined speed, an accident could cause injury to the occupant 26 of the vehicle 20 and the mass 66 slides along the surface 90 to the actuated position, shown in FIG. 4, to press the movable contact fingers 72 into engagement with the fixed contact 84. This completes the electrical circuit 32 to operate the safety apparatus 22 and protect the occupant 26 of the vehicle 20 during an accident. Thus, the sensor assembly 30 is not actuated by relatively low-impact forces resulting from a minor bumping of the vehicle against a barrier since the forces of the accident are insufficient to cause injury to the occupant 26. However, as the speed of the vehicle increases, the forces resulting from the vehicle encountering an accident increase and, at a predetermined speed, the sensor assembly 30 is actuated to effect operation of the safety apparatus 22 to protect the occupant 26 against the relatively large forces of an accident.

When the vehicle 20 is being driven along a road, it may encounter "chuck" holes or dips and ridges in the road which can subject the vehicle to a high instantaneous deceleration. However, the deceleration is at a high frequency, and thus the duration of the deceleration is insufficient to result in injury to the occupant 26 of the vehicle 20. The biasing effect of the contact fingers 72 is such as to retain the mass 66 against movement to the actuated position due to such instantaneous high-frequency deceleration. Moreover, the biasing effect of the contact fingers 72 is also such as to retain the mass against movement due to vehicle deceleration as a result of braking. Accordingly, the mass 66 slides through a relatively small distance, when the vehicle 20 is braked or encounters certain road conditions and does not move the contact fingers 72 into engagement with the fixed contact 84. During these conditions, the scribe member 112 is not operable to record upon the grid member 114 as the scribe is not moved past the inner portion 120 of the grid 114.

When the vehicle 20 encounters particularly severe road conditions, the vehicle may be subjected to impact forces which will for an instant, be in excess of the impact forces encountered in many accidents. In tests run by the applicant, such a severe road condition was created by stacking boards to a height of over 5 inches and driving the vehicle 20 across the boards. The resultant impact forces and vehicle deceleration were of relatively large magnitude and would have caused the mass 66 to move to the actuated position, if maintained for a substantial period of time. However, these large impact forces were instantaneous in nature and of insufficient duration to effect movement of the mass 66 from the initial position to the actuated position. Thus, even when the vehicle 20 encounters extremely severe road conditions resulting in high instantaneous deceleration, the sensor assembly 30 is not actuated. This is because the high deceleration is of insufficient duration, (i.e., high frequency) to overcome the biasing effect of the contact fingers 72 to cause the mass 66 to move from the initial position to the actuated position. During these abnormal conditions the scribe member 112 moves into the portion 116 of the grid 114 and effects recordation thereon.

During an accident, the occupant 26 moves forwardly toward the windshield 60 in much the same manner as in which the mass 66 moves from the initial position of FIGS. 2 and 3 to the operated position of FIG. 4. However, during an accident the mass 66 leads or moves before the occupant begins to move to effect operation of the safety apparatus 22. The extend to which the movement of the mass 66 leads the movement of the occupant 26 can be adjusted by varying the biasing force with which the contact fingers 72 press the mass 66 into engagement with the stop section or member 100. As disclosed and claimed in application Ser. No. 753,948, a biasing force of between 2 and 16 times the weight of the mass 66 results in response characteristics similar to that of the occupant 26. During an accident of sufficient magnitude, the scribe member 112 moves through the portion of the grid 116 and moves to the outer portion 118. When the scribe contacts the outer portion of the grid 118, the contact fingers 72 will engage the fixed contact 84 and the safety device 22 will be actuated.

The grid member 114 and the scribe member 112 are disposed in relationship the each other so that upon the occurrence of an accident of sufficient magnitude, the scribe member 112 will record movement of the grid portion 116 to the outer portion of the grid 118. This recordation of the movement of the mass 66 can later be used to interpret the forces of an accident. If, for example, an accident occurs in which the occupant of the vehicle is injured and the safety apparatus 22 in not actuated, then examination of the grid member 114 will allow an investigator to determine if the accident was of a sufficient magnitude so that the sensor 30 should have set off the safety apparatus 22. If the recordation on the grid member 114 does not contact the outer portion 118 of the grid member, then it can be assumed that the accident was of a magnitude in which the sensor 30 was not supposed to set off the safety apparatus 22.

A proper relationship of the mass, spring and distance of movement of the mass are necessary to enable the sensor assembly 30 to discriminate between the various road conditions encountered by a vehicle and an accident, as disclosed in application Ser. No. 753,948. The movable contact fingers 72 are preferably moved through a distance of from 0.25 of an inch to 0.50 of an inch when they are moved by the mass 66 into engagement with the fixed contact 84, but the distance could be as small as 0.1 of an inch or as large as 1 inch. During this movement, the contact fingers 72 exert a biasing force, of from 2 to 16 times the weight of the mass, resisting movement of the contact fingers. It has been generally found that if the distance through which the mass is moved from the initial position to the actuated position is less than 0.1 of an inch, the mass may be displaced to the actuated condition by severe road conditions causing an instantaneous high deceleration, even though the vehicle 20 has not encountered an accident. Generally, if the distance through which the mass 66 is displaced from the initial position to the actuated position is more than 0.1 inch, the time required for the mass to travel the distance will be too great. If the biasing force of the spring against the mass is low, the mass may move under the influence of vibrations resulting from road conditions or braking. Of course, too high a biasing force would prevent operation of the sensor assembly during certain accidents.

In addition to the influence of the contact fingers 72, the mass 66 is prevented from moving toward the actuated position under the influence of vibrations from road conditions by the stop member 100 which is formed of an energy-absorbing material having a coefficient of restitution which is less than 0.3. If the stop member 100 was formed of a material having a relatively high coefficient of restitution, for example, a coefficient of restitution in excess of 0,9 the rebound of the mass from the stop member 100 and vibration of the mass relative to the stop member could result in the mass being moved to the actuated position, even though the vehicle did not encounter an accident.

In view of the foregoing, it can be seen that the collision sensor assembly 30 has a mass 66 which moves to an actuated position to effect actuation of the safety apparatus 22. The mass 66 is held against the energy-absorbing stop 100 by the resiliently yieldable contact fingers 72 which restrain the mass against moving to the actuated position under the influence of forces and vibrations resulting from normal road and braking conditions. The mass 66 moves from the initial position to an actuated position against the influence of the contact fingers 72 as a function of the duration and magnitude of the average deceleration of the housing 80 over the elapsed time interval from the occurrence of an accident. Therefore, the mass 66 is nonresponsive to relatively high rates of deceleration of short duration (i.e., high frequency) similar to that associated with severe road conditions. Of course, if the vehicle 20 was subject to the high rate of deceleration for a longer time period, the mass 66 would be moved to the actuated position to effect operation of the safety apparatus 22 to protect the occupant 26.

Upon occurrence of any type of accident resulting in the application of forces greater than or equal to a predetermined minimum magnitude and in a direction within the included angle of the walls 96 and 98, the mass 66 moves forwardly relative to the housing 80 to press the contact fingers 72 into engagement with the fixed contact 84 to complete a circuit and effect inflation of the confinement 24 immediately before the occupant 26 begins to move forwardly under the influence of the accident forces. This insures that the confinement 24 is inflated in time to protect the occupant 26 and insures that the confinement 24 is not deflated before the effect of the accident forces on the occupant 26 are at least partially overcome by penetration or engagement of the occupant 26 with the confinement 24. Of course, the sensor assembly 30 and safety apparatus 22 could, if desired, be located in orientation other than the one illustrated herein to protect an occupant of a vehicle against accident forces tending to move him in a direction other than the forward direction. Utilization of other orientations would obviously require a rearrangement of the specific spring fingers 72 to that the baising effect of the fingers would match the potential deformability of the vehicle.

Having described my invention, I claim:

1. A collision sensor for activating a safety device on a vehicle to protect an occupant of the vehicle during a collision, said sensor comprising a housing defining a chamber therein, a support located in said chamber, first electrical contact means located within said housing, second contact means located within said housing, second contact means located adjacent to said support and spaced from said first contact means and movable relative to said first contact means, a mass slidably disposed on a surface of said support and movable in a plurality of directions within said housing from an initial position to any one of a plurality of activated positions in which said mass presses said movable second contact means into engagement with said first contact means to effect operation of the safety device upon the occurrence of a collision, said mass comprising a generally cylindrically shaped member having an arcuate outer surface, and said movable second contact means comprising a plurality of spring elements in engagement with said arcuate outer surface of said mass biasing said mass toward said initial position, said spring elements being movable with said means in a direction away from said support and toward said first contact means upon movement of said mass to one of said activated positions and being operable to provide different biasing forces of said mass against movement thereof to different ones of said plurality of activated positions.

2. A collision sensor as set forth in claim 1 wherein said mass has a generally cylindrical configuration.

3. A collision sensor as set forth in claim 1 further including a recording means for recording an indication of the direction of movement of said mass from said initial position upon the occurrence of an accident.

4. A collision sensor for use in actuating a safety device on a vehicle for protecting an occupant of the vehicle during a collision, said sensor comprising a housing adapted to be secured to a part of the vehicle, fixed contact means located within said housing, movable contact means mounted in said housing and spaced from said fixed contact means, and a mass movable within said housing from an initial position upon the occurrence of a collision to an actuated position in which said mass presses said movable contact means into engagement with said fixed contact means to effect operation of the safety device, said movable contact means including a plurality of spring finger means which bias said mass against movement from said initial position and wherein the number of spring finger means which bias said mass varies as a function of the direction in which said mass moves relative to said vehicle.

5. A collision sensor as defined in claim 4 wherein movement of said mass from said initial position toward said actuated position effects a decrease in the number of spring fingers which bias said mass.

6. A collision sensor as defined in claim 4 wherein said contact fingers are disposed in abutting engagement with the outer periphery of said mass.

7. A collision sensor for use in actuating a safety device on a vehicle for protecting an occupant of the vehicle during a collision, said sensor comprising a housing adapted to be secured to a part of the vehicle, fixed contact means located within said housing, movable contact means mounted in said housing and spaced from said fixed contact means, and a mass movable within said housing from an initial position upon the occurrence of a collision to an actuated position in which said mass presses said movable contact means into engagement with said fixed contact means to effect operation of the safety device, said movable contact means being operable to apply a substantially linear biasing force to said mass when said mass moves to said actuated position and wherein, the magnitude of said substantially linear biasing force varies as a function of the direction of movement of said mass.

8. A collision sensor as defined in claim 7 wherein said movable contact means includes a plurality of spring finger means and wherein the number of spring finger means which bias said mass varies as a function of the direction in which said mass moves relative to said vehicle to thereby enable said sensor to respond to collisions of the same minimum magnitude when parts of the vehicle having different energy-absorbing characteristics are subjected to impacts of the same magnitude.

9. A collision sensor as defined in claim 8 wherein movement of said mass from said initial position toward said actuated position effects a decrease in the number of spring fingers which bias said mass.

10. A collision sensor for use in actuating a safety device on a vehicle for protecting an occupant of the vehicle during a collision, said sensor comprising a housing adapted to be secured to a part of the vehicle, fixed contact means located within said housing, movable contact means mounted in said housing and spaced from said fixed contact means, and a mass movable within said housing from an initial position upon the occurrence of a collision to an actuated position in which said mass presses said movable contact means into engagement with said fixed contact means to effect operation of the safety device, said movable contact means comprising a plurality of yieldable spring finger means for applying to said mass a biasing effect which varies as a function of the direction in which said mass moves relative to said vehicle.

11. A collision sensor for activating a safety device on a vehicle to protect an occupant of the vehicle during a collision, said sensor comprising a housing, fixed contact means located within said housing, movable contact means mounted in said housing and spaced from said fixed contact means, and a mass movable in a plurality of directions within said housing from an initial position to any one of a plurality of activated positions in which said mass presses said movable contact means into engagement with said fixed contact means to effect operation of the safety device upon the occurrence of a collision, said movable contact means being operable to apply to said mass a biasing effect which varies as a function of the direction of movement of said mass from said initial position to compensate for variations in the energy-absorbing capabilities of different parts of the vehicle so that said mass moves from said initial position to an actuated position for impacts of the same minimum magnitude against different parts of the vehicle.

12. A collision sensor for use in actuating a safety device on a vehicle for protecting an occupant of the vehicle during a collision, said sensor comprising a housing adapted to be secured to a part of the vehicle, fixed contact means located within said housing, movable contact means mounted in said housing and spaced from said fixed contact means, a mass movable within said housing from an initial position upon the occurrence of a collision to an actuated position in which said mass presses said movable contact means into engagement with said fixed contact means to effect operation of the safety device, a recording member operatively connected to said mass, an indicating means adjacent said recording member, said recording member having means operable to record upon said indicating means an indication of the path of movement of said mass when said mass moves to said actuated position during the occurrence of a collision, and wherein said movable contact means includes a plurality of spring finger means which bias said mass against movement from said initial position and wherein the number of spring finger means which bias said mass varies as a function of the direction in which said mass moves relative to said vehicle to thereby enable said sensor to respond to collisions of the same minimum magnitude when parts of the vehicle having different energy-absorbing characteristics are subjected to impacts of the same magnitude.

13. A collision sensor as defined in claim 12 wherein movement of said mass from said initial position toward said actuated position effects a decrease in the number of spring fingers which bias said mass.

14. A collision sensor for sue in actuating a safety device on a vehicle for protecting an occupant of the vehicle during a collision, said sensor comprising a housing adapted to be secured to a part of the vehicle, fixed contact means located within said housing, movable contact means mounted in said housing and spaced from said fixed contact means, a mass movable within said housing from an initial position upon the occurrence of a collision to an actuated position in which said mass presses said movable contact means into engagement with said fixed contact means to effect operation of the safety device, a recording member operatively connected to said mass, an indicating means adjacent said recording member, said recording member having means operable to record upon said indicating means an indication of the path of movement of said mass when said mass moves to said actuated position during the occurrence of a collision, and wherein said movable contact means is operable to apply a substantially linear biasing force to said mass when said mass moves to said actuated position and wherein the magnitude of said substantially linear biasing force varies as a function of the direction of movement of said mass.

15. A collision sensor as defined in claim 14 wherein said movable contact means includes a plurality of spring fingers means and wherein the number of spring finger means which bias said mass varies as a function of the direction in which said mass moves relative to said vehicle to thereby enable said sensor to respond to collision of the same minimum magnitude when parts of the vehicle having different energy absorbing characteristics are subjected to impacts of the same magnitude.

16. A collision sensor as defined in claim 15 wherein movement of said mass from said initial position toward said actuated position effects a decrease in the number of spring fingers which bias said mass.

17. A collision sensor for use in actuating a safety device on a vehicle for protecting an occupant of the vehicle during a collision, said sensor comprising a housing adapted to be secured to a part of the vehicle, fixed contact means located within said housing, movable contact means mounted in said housing and spaced from said fixed contact means, a mass movable within said housing from an initial position upon the occurrence of a collision to an actuated position in which said mass presses said movable contact means into engagement with said fixed contact means to effect operation of the safety device, a recording member operatively connected to said mass, said movable contact means comprising a plurality of yieldable spring finger means for applying to said mass a biasing effect which varies as a function of the direction in which said mass moves relative to said vehicle thereby enable said sensor to respond to collision of the same minimum magnitude when parts of the vehicle having different energy-absorbing characteristics are subjected to impacts of the same magnitude, an indicating means including an impressionable grid adjacent said recording member, and said recording member having means operable to permanently record upon said indicating means an indication of the path of movement of said mass when said mass moves to said actuated position during the occurrence of a collision.

18. A collision sensor as defined in claim 17 wherein said contact fingers are disposed in abutting engagement with the outer periphery of said mass.

19. A collision sensor assembly for use in actuating a safety device on a vehicle to protect an occupant of the vehicle during an accident, said collision sensor comprising a housing having a support surface, a mass slidably mounted on said support surface, movable contact means extending adjacent said mass, and fixed contact means spaced from each of said contact means, said mass being movable from an initial position in a plurality of directions to any one of a plurality of actuated positions in which said movable contact means engages said fixed contact means upon the occurrence of an accident to effect operation of the safety device, said movable contact means being operable to apply to said mass a biasing effect which varies as a function of the direction of movement of said mass from said initial position to thereby enable said sensor assembly to be positioned in the vehicle in an orientation in which the variations in the biasing effect compensates for variations in the energy-absorbing capabilities of different parts of the vehicle so that said mass moves from said initial position to an actuated position for impacts of substantially the same minimum magnitude against the different parts of the vehicle.

20. A collision sensor as defined in claim 19 wherein said movable contact means comprises a plurality of contact fingers disposed in abutting engagement with the outer periphery of said mass.

21. A collision sensor as defined in claim 19 further including a recording member operatively connected to said mass and an indicating means adjacent said recording member ans wherein said recording member is operable to record upon said indicating means an indication of the direction of movement of said mass when said mass moves to an actuated position during the occurrence of an accident.

22. A collision sensor as defined in claim 21 wherein said indicating means comprises an impressionable surface, said recording member being operable to make an impression upon said surface upon movement of said mass to an actuated position.

23. A collision sensor as defined in claim 19 wherein said movable contact means includes a plurality of spring fingers which engage said mass and bias said mass toward said initial position, at least one of said spring fingers being operable to apply to said mass a biasing effect of a first magnitude and another of said spring fingers being operable to apply to said mass a biasing effect of a second magnitude which is larger than said biasing effect of said first magnitude to thereby compensate for variation in the energy-absorbing capabilities of different parts of the vehicle.

24. A collision sensor for activating a safety device on a vehicle to protect an occupant of the vehicle during an accident, said sensor comprising a housing, fixed contact means located within said housing, movable contact mans mounted in said housing and spaced from said fixed contact means, a mass movable in a plurality of directions within said housing from an initial position to any one of a plurality of activated positions in which said mass presses said movable contact means into engagement with said fixed contact means to effect operation of the safety device upon the occurrence of an accident, said movable contact means being operable to apply to said mass a biasing effect which varies as a function of the direction of movement of said mass said initial position to compensate for variations in the energy-absorbing capabilities of different parts of the vehicle so that said mass moves from said initial position to an actuated position for impacts of the same minimum magnitude against different parts of the vehicle, and recording means for recording an indication of the direction of movement of said mass from said initial position upon the occurrence of an accident.

25. A collision sensor as defined in claim 24 wherein said recording means includes a scribe member mounted on said mass and an impressionable surface mounted adjacent to said mass, said member being movable across said impressionable surface upon movement of said mass from said initial position to an actuated position to form an impression on said surface indicating the direction of movement of said mass.

26. A collision sensor for use in actuating a safety device on a vehicle for protecting an occupant of the vehicle during an accident, said sensor comprising a housing adapted to be secured to a part of the vehicle, fixed contact means located within said housing, movable contact means mounted in said housing and spaced from said fixed contact means by a distance of no less that 0.25 of an inch and no more than 0.5 of an inch, a mass movable in a plurality of directions within said housing from an initial position upon the occurrence of an accident to any of one of a plurality of actuated positions in which said mass presses said movable contact into engagement with said fixed contact means to effect operation of the safety device, spring means urging said mass against movement from said initial position to an actuated position with a biasing force of from 2 to 16 times the weight of said mass to retard movement of said mass from said initial position to an actuated position under the influence of vibration and deceleration resulting from road conditions and braking, said spring means being operable to apply to said mass a biasing effect which varies as a function of the direction of movement of said mass from said initial position to thereby enable said sensor to be positioned in the vehicle in an orientation in which the variations in biasing effect compensate for variations in the energy-absorbing capabilities of different parts of the vehicle so that said mass moves from said initial position to an actuated position in substantially the same length of time for impacts of the same magnitude against the different parts of the vehicle, an energy absorbing stop means against which said mass is urged by said spring means when mass is in said initial position and recording means for recording an indication of the direction of movement of said mass from said initial position to an actuated position.

* * * * *